(12) United States Patent
Huang et al.

(10) Patent No.: US 6,515,852 B2
(45) Date of Patent: Feb. 4, 2003

(54) EXTERNAL KEYBOARD FOR PERSONAL DIGITAL ASSISTANT

(75) Inventors: Chi-Te Huang, Chung Ho (TW); Yen-Chun Wu, Chung Ho (TW)

(73) Assignee: Ortek Technology, Inc., Chung Ho (TW)

( * ) Notice: Subject to any disclaimer, the term of this patent is extended or adjusted under 35 U.S.C. 154(b) by 121 days.

(21) Appl. No.: 09/843,817

(22) Filed: Apr. 30, 2001

(65) Prior Publication Data

US 2002/0159226 A1 Oct. 31, 2002

(51) Int. Cl.[7] .............................. G06F 1/16; H05K 5/03
(52) U.S. Cl. ....................... 361/680; 361/683; 361/686; 400/714; 235/145 R
(58) Field of Search ................................. 361/679–686, 361/724–727; 400/82, 88, 89, 693, 713, 714, 682; 341/22; 345/168, 169, 170, 179; 235/145 R, 145 A, 146

(56) References Cited

U.S. PATENT DOCUMENTS

| 5,548,477 | A | * | 8/1996 | Kumar et al. ................ 361/680 |
| 5,708,560 | A | * | 1/1998 | Kumar et al. ................ 361/680 |
| 5,712,760 | A | * | 1/1998 | Coulon et al. ............... 361/680 |
| 6,108,200 | A | * | 8/2000 | Fullerton .................... 361/686 |
| 6,154,759 | A | * | 11/2000 | Chou ......................... 361/683 |

* cited by examiner

Primary Examiner—Darren Schuberg
Assistant Examiner—Lisa Lea-Edmonds
(74) Attorney, Agent, or Firm—Bacon & Thomas, PLLC

(57) ABSTRACT

An external keyboard connected to a personal digital assistant (PDA) comprises a keyboard section, a cover including a first portion and a hinged second portion, and a connection port in the center of the hinge between the keyboard section and the cover, the connection port being capable of connecting to a connector of the PDA. A support member is formed at the hinge between first and second portions of cover opposite to an elastic restrain formed at the hinge of the first and the second portions of cover. The restrain is curved and is urged against one side the support member for fastening the support member at a first angle relative to the restrain in one position. Thus, first and second portions of cover are held at the same plane. In another position, second portion of cover is pivoted at a second angle relative to first portion thereof. One side of support member is pivoted to the same angle relative to restrain accordingly. Thus, support member is fastened at the second angle by the elasticity of restrain. As a result, second portion of cover is also held at the second angle. When PDA is connected to connection port and held in first portion of cover, keyboard and PDA are prevented from tipping over by the support of second portion of cover.

11 Claims, 4 Drawing Sheets

EXTERNAL KEYBOARD FOR PERSONAL DIGITAL ASSISTANT

FIELD OF THE INVENTION

The present invention relates to personal digital assistants and more particularly to an external keyboard capable of connecting to a personal digital assistant with improved characteristics.

BACKGROUND OF THE INVENTION

Currently, personal digital assistants (PDAs) are poplular due to portability, etc. Hence, memo, phone book, and other features provided by PDA are performed in a hand-written manner (i.e., a plurality of alphanumeric characters are inputted). Thus, a plurality of records of memo or telephone number may be stored in PDA for future access. However, such hand-written input is not sufficient for ever increasing features provided by newly available PDAs. Thus, an external keyboard is commercially available recently served as an additional input device for PDA. Typically, such keyboard includes a plurality of keys. Hence, user may edit memo or phone book by inputting through the keyboard connected to PDA.

A conventional externally connected keyboard 11 for PDA 2 is shown in FIG. 1. A cover 13 is hinged to one side of keyboard 11. Hence, cover 13 may pivot about the hinge to open or close the keyboard 11. A slot 16 is provided in the center on the hinged side of cover 13. Hence, a connection port 15 projected above slot 16 may be received in slot 16 when the cover 13 is closed. Connection port 15 has one side connected to cover 13. Thus, connection port 15 is open when cover 13 is open. Connection port 15 is connected to a connector of PDA 2. Connection port 15 has a plurality of pins connected to electronics and keys of keyboard 11 through conductors. PDA 2 is electrically connected keyboard 11 when connector on one side of PDA 2 is connected to connection port 15. As a result, user is able to input by keying the keyboard 11.

A friction based support member (not shown) is provided between the hinge of cover 13 and keyboard 11. The friction based support member is able to support an open cover 13 at one of a plurality of angular locations relative to the keyboard 11. Thus, PDA 2 may be supported by cover 13 at the angle when connected to connection port 15. A cavity 12 is provided in the bottom of keyboard 11. A retractable support 17 is provided in the cavity 12. In a use position, handle (i.e., first enlargement) 171 of support 17 is pulled from cavity 12 until the bottom end (i.e., second enlargement) 172 is stopped at the narrow opening of cavity 12. Such additional support area at the bottom of keyboard 11 provided by the extended support 17 may reliably support PDA 2 for preventing PDA 2 and keyboard 11 from tipping over. However, such cavity 12 in the bottom of keyboard 11 for receiving the support 17 inevitably increases the thickness of keyboard 11. This makes a compact keyboard impossible. Thus, improvement exists.

SUMMARY OF THE INVENTION

It is an object of the present invention to provide an external keyboard connected to a personal digital assistant (PDA) comprising a keyboard section, a cover including a first portion and a hinged second portion, and a connection port in the center of the hinge between the keyboard section and the cover, the connection port being capable of connecting to a connector of the PDA. A support member is formed at the hinge between first and second portions of cover opposite to an elastic restrain formed at the hinge of the first and the second portions of cover. The restrain is curved and is urged against one side of the support member for fastening the support member at a first angle relative to the restrain in one position. Thus, first and second portions of cover are held at the same plane. In another position, second portion of cover is pivoted at a second angle relative to first portion thereof. One side of support member is pivoted to the same angle relative to restrain accordingly. Thus, support member is fastened at the second angle by the elasticity of restrain. As a result, second portion of cover is also held at the second angle. When PDA is connected to connection port and held in first portion of cover, keyboard and PDA are prevented from tipping over by the support of second portion of cover.

The above and other objects, features and advantages of the present invention will become apparent from the following detailed description taken with the accompanying drawings.

DETAILED DESCRIPTION OF THE PREFERRED EMBODIMENTS

Figure 2:
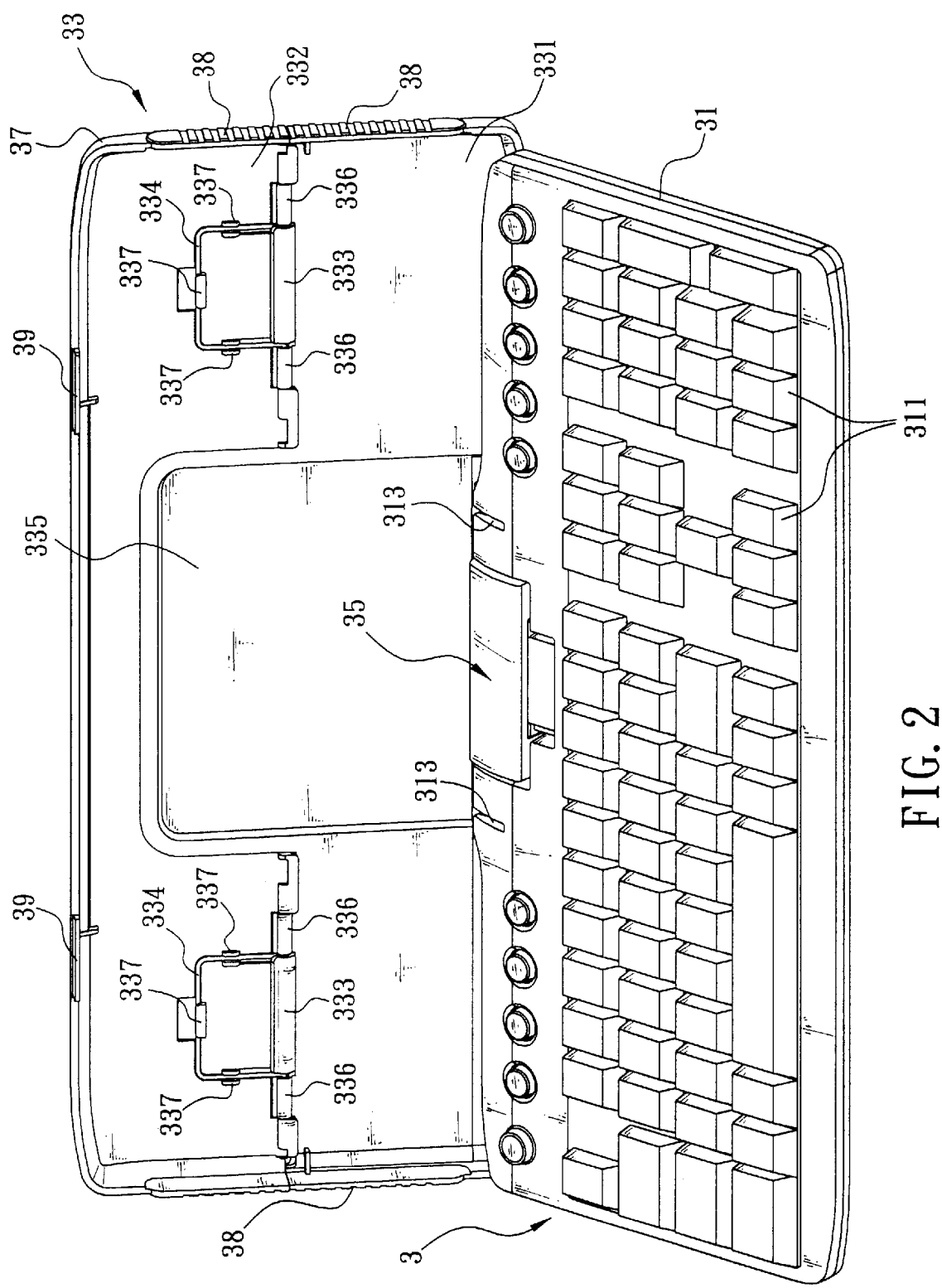
FIG. 2 is a perspective view of a first preferred embodiment of external keyboard capable of connecting to a personal digital assistant according to the invention.

Referring to FIG. 2, there is shown a first embodiment of external keyboard 3 capable of connecting to a personal digital assistant (PDA) in accordance with the invention. The keyboard 3 comprises a keyboard section 31, a cover 33 including a first portion 331 and a hinged second portion 332, the cover 33 being hinged to one side of keyboard section 31 for pivoting about the hinge to open or close the keyboard section 31, a connection port 35 hinged in the center of the hinged side between keyboard section 31 and cover 33 in which in a pivoted position the connection port 35 is capable of connecting to connector of PDA, and a plurality of support members 334 (two are shown) at the hinge between first portion of cover 331 and second portion of cover 332 such that the support members 334 are able to support an open second portion of cover 332 at one of a plurality of angular locations relative to first portion of cover 331.

In the first embodiment, first portion of cover 331 and second portion of cover 332 are hinged together at one side. First portion of cover 331 is also hinged to keyboard section 31 at the opposite other side, where a projection (not numbered) is provided on the first portion of cover 331. Two spaced slots 313 are provided on the central portion of the side of keyboard section 31 for receiving the projection of first portion of cover 331 hinged therein. Hence, first portion of cover 331 is able to hinge to keyboard section 31. A restrain 333 having a curved body (thus having an elasticity) and an extension plate is provided at the hinge of first portion of cover 331 and second portion of cover 332. Support member 334 is provided at the hinge between first portion of cover 331 and second portion of cover 332 spaced from restrain 333 by the extension plate of restrain 333. In one position when first portion of cover 332 is pivoted to a first angle relative to the keyboard section 31, restrain 333 is urged against one side of support member 334 for fastening support member 334 by the elasticity of the bent restrain 333. Hence, first portion of cover 331 and second portion of cover 332 are held at the same plane. In another position, second portion of cover 332 is pivoted at second angle relative to first portion of cover 331. At this position, one side of support member 334 is pivoted to the second angle relative to restrain 333 accordingly. Thus, support member 334 is fastened at the second angle by the elasticity of the restrain 333. As a result, second portion of cover 332 is also held at the second angle, i.e., a gable shape is formed by first portion of cover 331 and second portion of cover 332 (FIG. 4).

Figure 3:
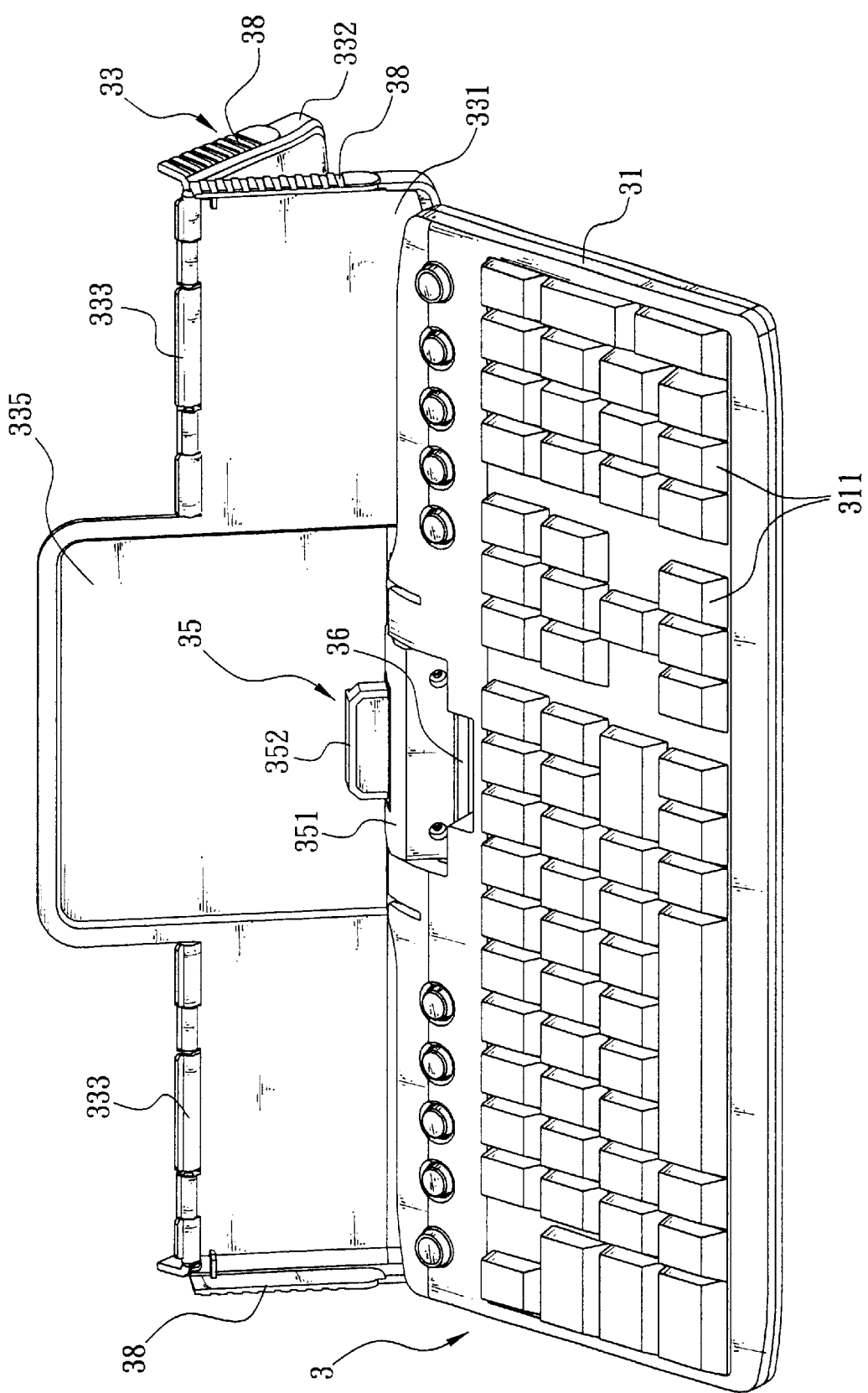
FIG. 3 is a perspective view of a second preferred embodiment of external keyboard capable of connecting to a personal digital assistant according to the invention where second portion of cover is pivoted to have one side in contact with a supporting object.
Figure 4:
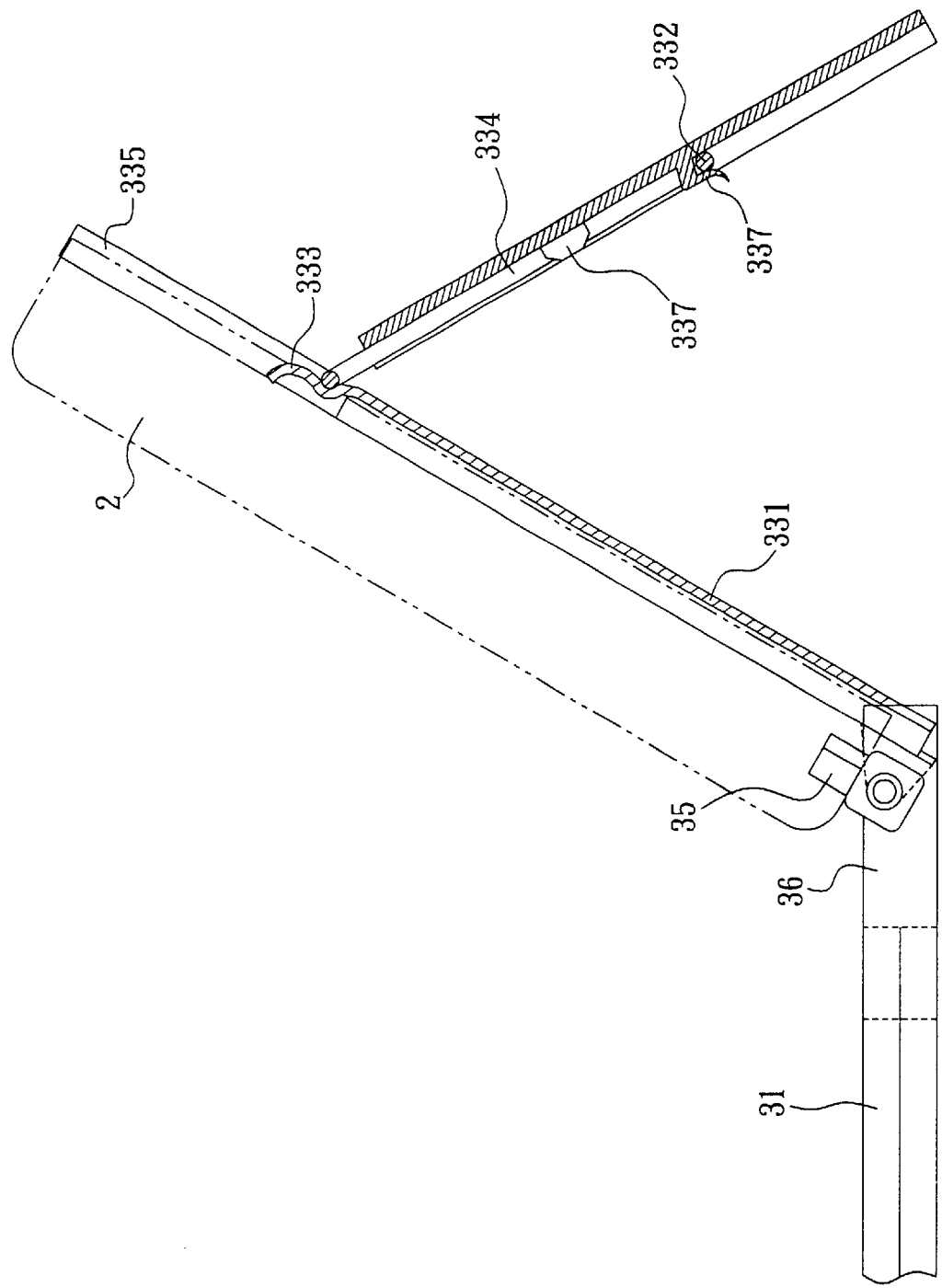
FIG. 4 is a side view in part section of FIG. 3 where PDA is mounted.

In a second embodiment shown in FIGS. 3 and 4, a trough 36 is formed on keyboard section 31 corresponding to and for receiving connection port 35. Thus, connection port 35 is pivoted to receive in trough 36 when cover 33 is pivoted to close keyboard section 31. On the top of connection port 35, there are a plurality of pins which are connected to electronics and keys 311 of keyboard section 31 through conductors. Hence, PDA 2 is electrically connected keyboard section 311 when connector of PDA 2 is connected to connection port 35. As a result, user is able to input alphanumeric data by keying the keyboard section 311 (FIG. 3). A plate 335 having a recessed flat area is provided at the central portion of first portion of cover 331 for receiving PDA 2. In detail, PDA 2 is supported in the plate 335 and by the first portion of cover 331 when connector of PDA 2 is connected to connection port 35 by sliding PDA 2 toward the connection port 35. Connection port 35 consists of a base 351 having two sides hinged to keyboard section 31 and a connection portion 352 having a plurality of pins on the top side. The shape of connection portion 352 is conformed to that of the connector of PDA 2 as to be received therein. As an end, pins in connection portion 352 are electrically connected to holes in connector of PDA 2 when connector of PDA 2 is connected to connection portion 352.

Figure 1:
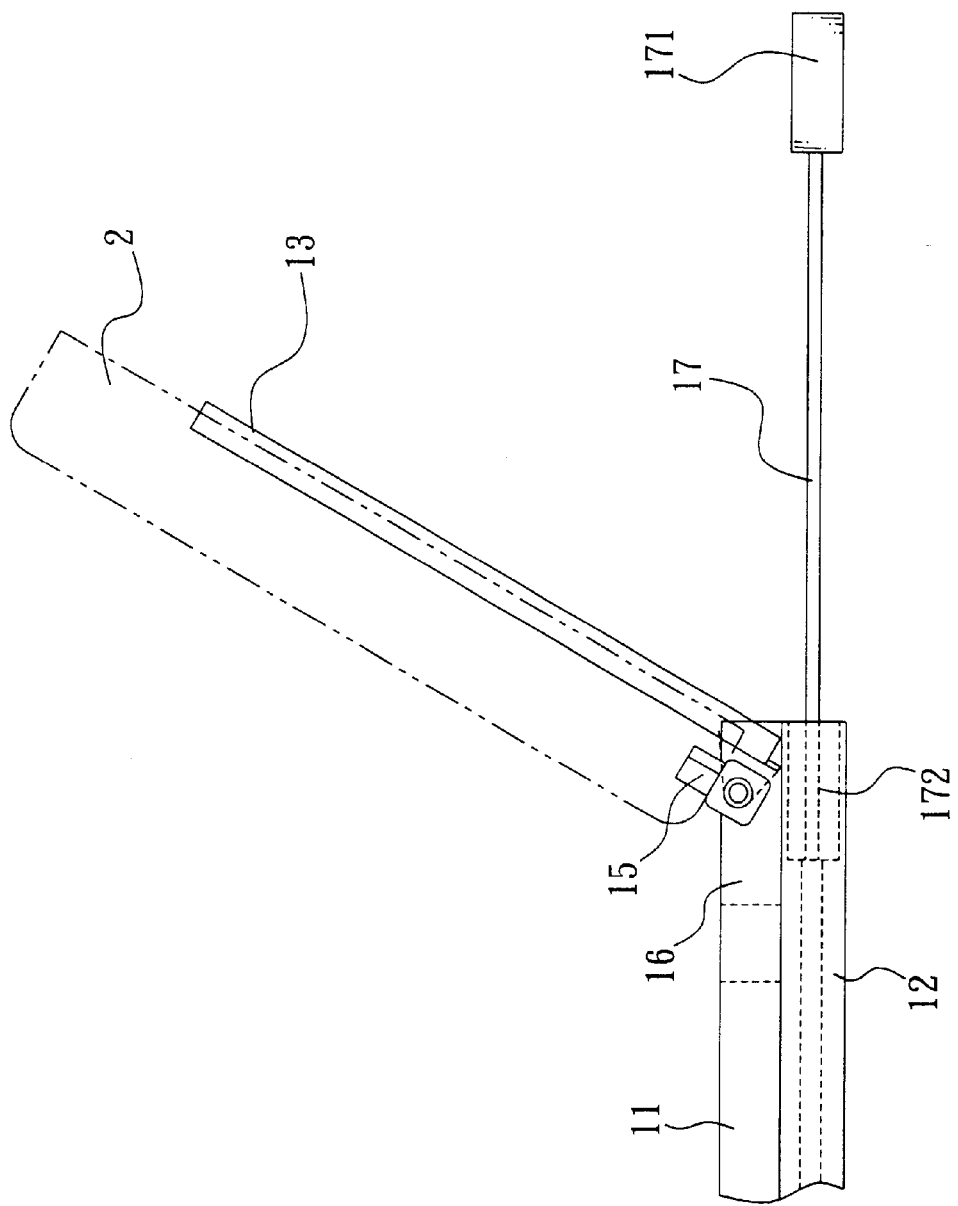
FIG. 1 is a side view schematically showing a conventional external keyboard connected to a personal digital assistant.

Referring to FIGS. 1 and 4 specifically, support member 334 has a cylindrical-like body. Two ends of support member 334 are pivotally connected to sleeves 336 of first portion of cover 331. The side of support member 334 opposite to restrain 333 is fastened by a latch 337 on second portion of cover 332. Hence, support member 334 is held in the inner surface of second portion of cover 332. Also, restrain 333 has a substantially S-shaped section, thus having elasticity. In one position, restrain 333 is urged against two ends of support member 334 by the elasticity of the bent restrain 333. Hence, support member 334 is held in a first angle relative to the restrain 333. As such, when second portion of cover 332 is further pivoted to another angle relative to first portion of cover 331. Support member 334 is also pivoted at the first angle. At this position, support member 334 is fastened at the first angle by the elasticity of the restrain 333 exerted thereon. As a result, second portion of cover 332 is also held at the first angle, i.e., a gable shape is formed by first portion of cover 331 and second portion of cover 332.

Referring to FIGS. 1 and 2 specifically, a raised peripheral edge 37 is formed on cover 33 for completely sealing keyboard section 31 when cover 33 is closed. A toothed slip-resistant member 38 is formed on either side of cover 33. Such toothed slip-resistant member 38 may facilitate opening cover 33 by hand. Two spaced latched members 39 are formed on the side of second portion of cover 332 between the slip-resistant members 38. Also, the latched members 39 may facilitate pivoting second portion of cover 332 to an angle relative to first portion of cover 331 by hand.

Referring to FIG. 4 specifically, when PDA 2 is connected to connection port 35 and held in the plate 335 of first portion of cover 331, keyboard 3 and PDA 2 are prevented from tipping over by the support of second portion of cover 332.

While the invention has been described by means of specific embodiments, numerous modifications and variations could be made thereto by those skilled in the art without departing from the scope and spirit of the invention set forth in the claims.

What is claimed is:

1. An external keyboard connected to a personal digital assistant (PDA) comprising:
   a keyboard section having a plurality of keys;
   a cover including a first portion hinged to one side of said keyboard section, a second portion, said cover being capable of pivoting about said hinged side of said keyboard section so as to open or close said keyboard section, and at least one support member at said other side of said first portion of said cover opposite to said hinged side of said keyboard section for hinging said second portion of said cover such that said support member is able to support said second portion of said cover at one of a plurality of angular locations relative to said first portion of said cover; and
   a connection port hinged in said hinged side between said keyboard section and said cover, said connection port being capable of connecting to a connector of said PDA.

2. The external keyboard of claim 1, wherein one end of said support member is pivotally connected to said first portion of said cover and said other end thereof is secured to said second portion of said cover respectively.

3. The external keyboard of claim 1, wherein one end of said support member is secured to said first portion of said cover and said other end thereof is pivotally connected to said second portion of said cover respectively.

4. The external keyboard of claim 2, further comprising a restrain at one of said first and said second portions of said cover disposed corresponding to said hinged side of said support member such that said restrain is urged against said hinged side of said support member for fastening said support member at an angle relative to said first portion of said cover by said elasticity of said bent restrain.

5. The external keyboard of claim 4, wherein said support member has a cylindrical-like body.

6. The external keyboard of claim 4, wherein said restrain has a substantially S-shaped section such that said restrain is urged against said hinged side of said support member for fastening said support member at said angle relative to said first portion of said cover by said elasticity of said restrain.

7. The external keyboard of claim 1, wherein said first portion of said cover comprises a plate having a recessed flat area said central portion thereof so that said PDA is supported in said plate and by said first portion of said cover when said connector of said PDA is connected to said connection port by sliding said PDA toward said connection port.

8. The external keyboard of claim 1, further comprising at least one projection at said hinged side between said first portion of said cover and said keyboard section and two spaced slots on said hinged side between said keyboard section and said first portion of said cover for hinging said projection therebetween.

9. The external keyboard of claim 1, further comprising a trough at said hinged side between said first portion of said cover and said keyboard section for pivotally receiving said connection port.

10. The external keyboard of claim 8, wherein said connection port comprises a base having two sides hinged to said keyboard section and a connection portion having a plurality of pins on said top side, said shape of said connection portion being conformed to that of said connector of said PDA as to be received therein and said pins of said connection portion being electrically connected to holes in said connector of said PDA when said connector of said PDA is connected to said connection portion.

11. The external keyboard of claim 3, further comprising a restrain at one of said first and said second portions of said cover disposed corresponding to said hinged side of said support member such that said restrain is urged against said hinged side of said support member for fastening said support member at an angle relative to said first portion of said cover by said elasticity of said bent restrain.

* * * * *